US012800904B2

(12) United States Patent
Ragazzoni

(10) Patent No.: US 12,800,904 B2
(45) Date of Patent: Nov. 17, 2026

(54) OPTICAL SYSTEM, IN PARTICULAR A TELESCOPE

(71) Applicant: ISTITUTO NAZIONALE DI ASTROFISICA, Rome (IT)

(72) Inventor: Roberto Ragazzoni, Rovigo (IT)

(73) Assignee: ISTITUTO NAZIONALE DI ASTROFISICA, Rome (IT)

( * ) Notice: Subject to any disclaimer, the term of this patent is extended or adjusted under 35 U.S.C. 154(b) by 205 days.

(21) Appl. No.: 18/855,404

(22) PCT Filed: Apr. 7, 2023

(86) PCT No.: PCT/IB2023/053583
§ 371 (c)(1),
(2) Date: Oct. 9, 2024

(87) PCT Pub. No.: WO2023/199190
PCT Pub. Date: Oct. 19, 2023

(65) Prior Publication Data
US 2025/0334786 A1 Oct. 30, 2025

(30) Foreign Application Priority Data
Apr. 11, 2022 (IT) ........................ 102022000007178

(51) Int. Cl.
*G02B 23/00* (2006.01)

(52) U.S. Cl.
CPC .................................... *G02B 23/00* (2013.01)

(58) Field of Classification Search
USPC .......................................................... 359/399
See application file for complete search history.

(56) References Cited

U.S. PATENT DOCUMENTS 10,423,004 B2 * 9/2019 Arai ........................ G02B 23/02

FOREIGN PATENT DOCUMENTS

WO 2014048820 A1 4/2014

OTHER PUBLICATIONS

Aaron M Brown et al: "Panoramic SETI: overall mechanical system design", arxiv.org, Cornell University Library, 201 Olin Library Cornell University Ithaca, NY 14853, Nov. 24, 2021.

(Continued)

*Primary Examiner* — Dung T Nguyen
(74) *Attorney, Agent, or Firm* — Carmel Patent Agency; Robert Ballarini

(57) ABSTRACT

An optical system includes an optical device which is a spherical body or has a spherical shape and includes a first spherical surface, a plurality of two-by-two adjacent blocks covering the first spherical surface, and at least one light-transparent filler substance contained in a spherical cavity of the optical device. The optical system includes a curved focal plane surrounding the optical device and on which an image produced by the latter is focused, and a receiving device having a plurality of chambers arranged at the curved focal plane. Each chamber includes a field lens and a diaphragm arranged downstream of the field lens with respect to the center of the optical device. The diaphragm has the center on the optical axis of the field lens so that optical projection of the diaphragm onto the optical device through the field lens defines a virtual diaphragm extending into the optical device.

15 Claims, 5 Drawing Sheets

(56) References Cited

OTHER PUBLICATIONS

Figure 1:
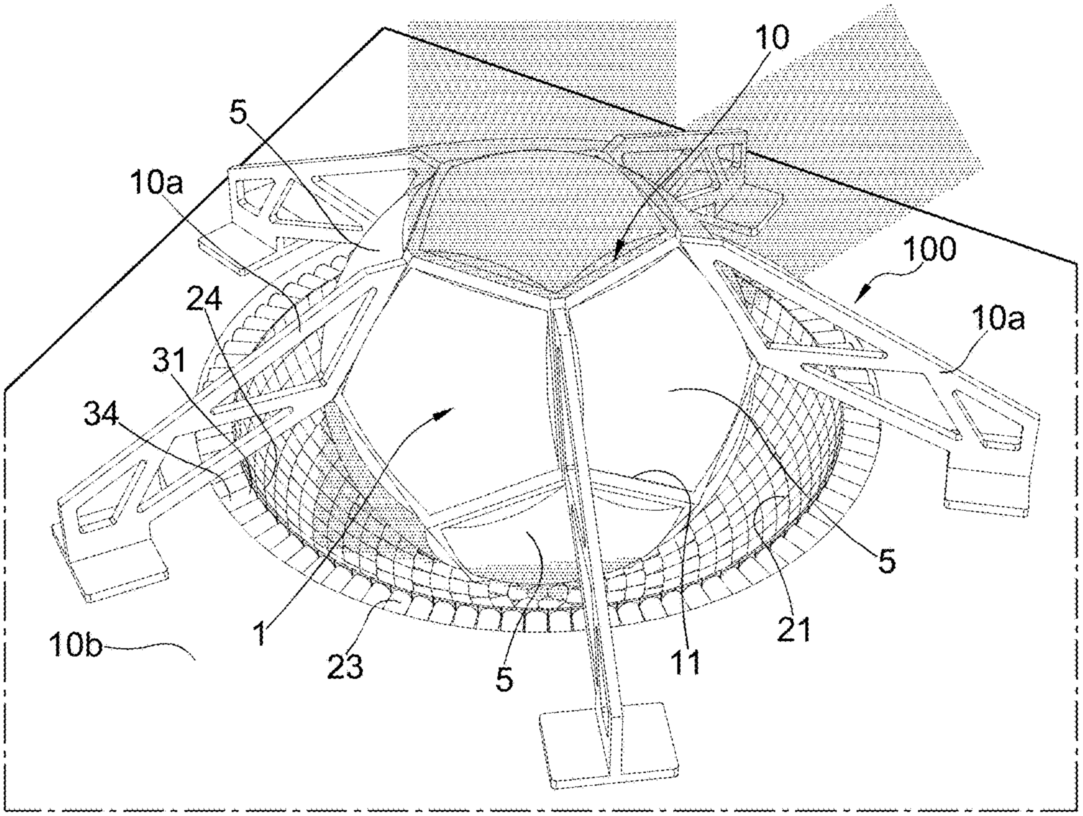

Law Nicholas M. et al: “Low-cost Access to the Deep, High-cadence Sky: the Argus Optical Array”, Publications of the Astronomical Society of the Pacific, vol. 134, No. 1033, Mar. 1, 2022 (Mar. 1, 2022), p. 035003.

* cited by examiner

Fig.3B
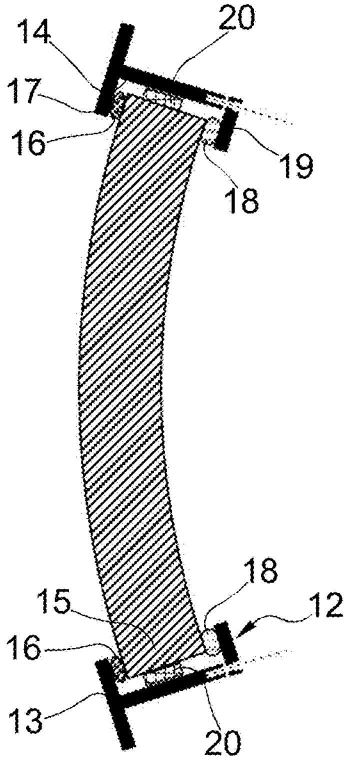
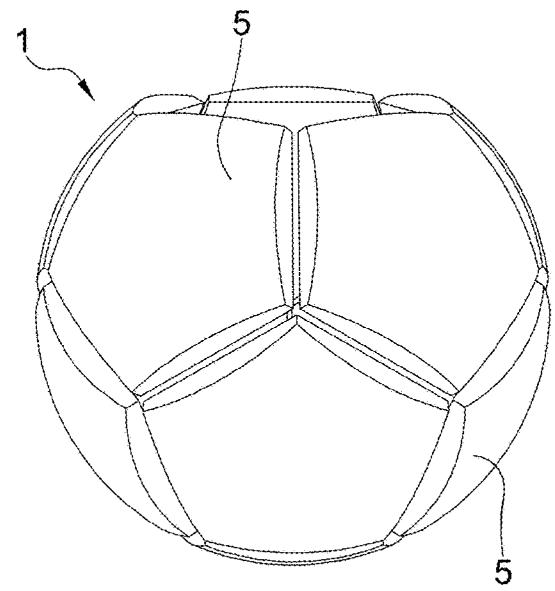
Fig.3A
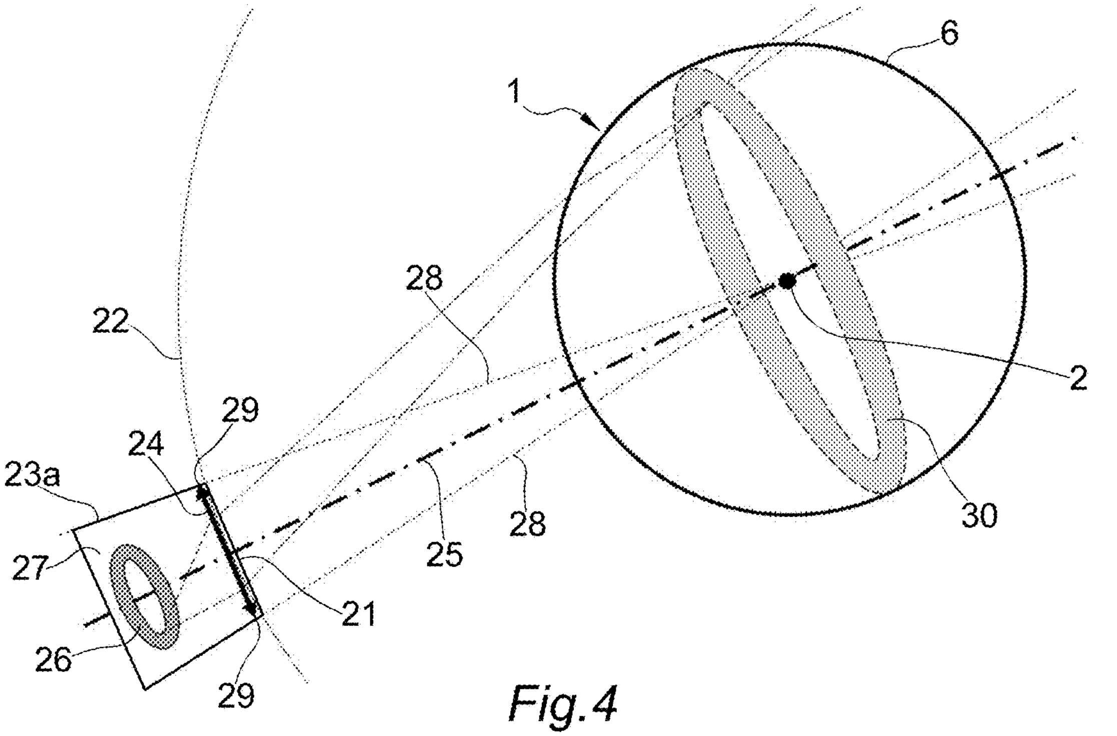
Fig.4

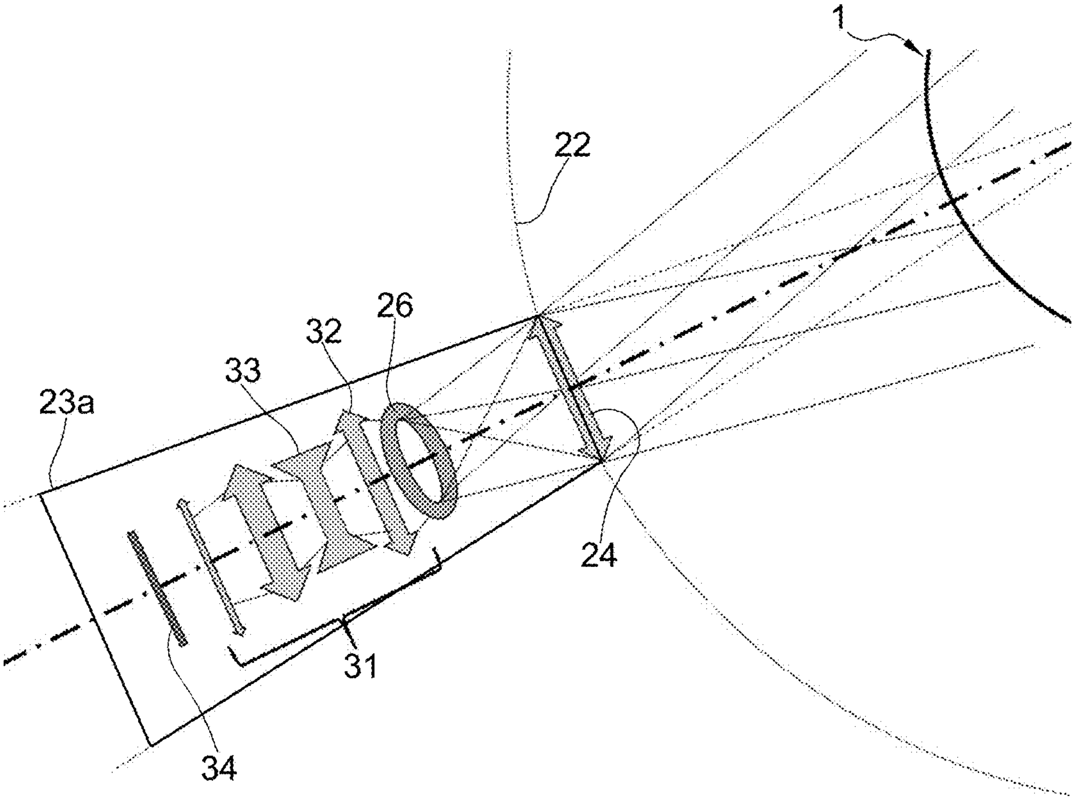
Fig.5
Fig.7
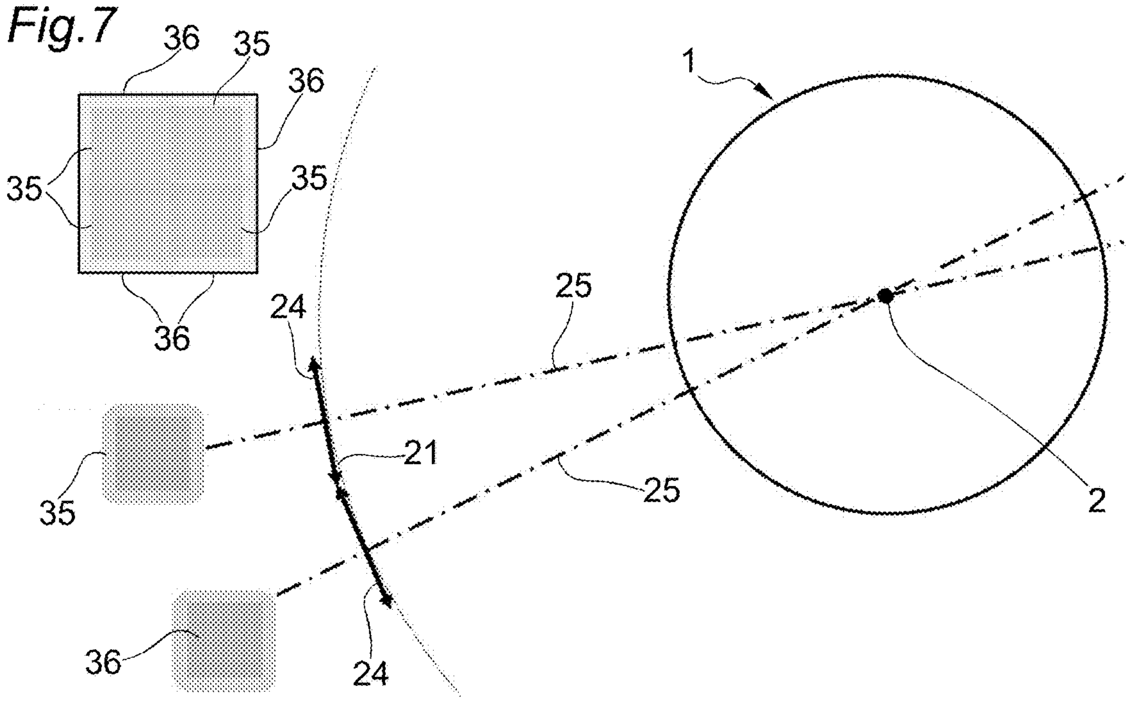
Fig.6

OPTICAL SYSTEM, IN PARTICULAR A TELESCOPE

TECHNICAL SCOPE

The present invention relates to an optical system, in particular to a telescope.

TECHNOLOGICAL BACKGROUND

The present invention finds a preferred, although not exclusive, application in the technical field relating to apparatuses or instruments for the observation of objects at a far distance, in particular to optical instruments used in astronomy for the observation of celestial bodies where there is generally a need for a continuous search of the visible sky from a single point on the Earth's surface, or from a planetary surface.

The present invention can also be applied to optical instruments where half of the entire field of view available is of particular interest, such as for example in the observations of the seabed from the keel of a ship or of the Earth's surface observed by a satellite in low orbit.

In the case of night-time applications from a single point on the Earth's surface, this type of search comprises patrolling transient phenomena (e.g. variations in brightness, colour, shape, or position) of natural or artificial objects in the field of the wavelengths of the visible optical radiations and adjacent to them (infrared and ultraviolet). A non-exhaustive list of these transient phenomena in the domain of natural phenomena may comprise, for example, new stars and supernovae stars, variable stars, eclipse binary stars, stars with transiting exoplanets, asteroids, asteroids orbiting close to Earth, meteorites, atmospheric phenomena (electric flashes, cloud formations, etc.), gamma light flashes, and currently unknown phenomena. A similarly non-exhaustive list of visible artificial phenomena with a search system capable of simultaneously observing half of the entire field of view, not necessarily, but often preferably, in night conditions, comprises, for example, transit of artificial satellites, orbiting debris (often known as "space junk"), missiles and rockets (including the upper stages of suborbital or orbital launches), release of gases at high altitude, aircraft, contrails and drones.

The ability to detect these phenomena depends critically on the ability of an observation system to simultaneously collect light from the entire sky with as much equivalent opening as possible. The equivalent opening represents the geometric surface dimension of the collection of light emitted by the phenomena under study, such as for example those listed above.

Normally, the large opening optical systems are incompatible with large fields of view, unless a large number of large opening optical systems are multiplied.

For example, taking an opening equivalent to that of a circular one of one metre in diameter as a reference, a conventional telescope is able to cover fields of view in the order of one square degree.

Even currently existing optical systems in the field of openings from one metre in diameter and beyond of ten square degrees would require the duplication of thousands or tens of thousands of these telescopes to simultaneously cover the entire celestial vault available for a single position on Earth or equivalent situation.

The search of the entire sky with small openings is therefore generally solved with the mass duplication of the telescopes, in the case of small openings (up to a maximum of a few tens of centimetres of equivalent diameter).

By way of an example, consider the article by LAW NICHOLAS M. ET AL: "Low-cost Access to the Deep, High-cadence Sky: the Argus Optical Array", PUBLICATIONS OF THE ASTRONOMICAL SOCIETY OF THE PACIFIC, vol. 134, no. 1033, 1 Mar. 2022 (2022-03-01), page 035003, XP093001948, US, ISSN: 0004-6280, D01: 10.1088/1538-3873/ac4811. This article refers to the "ARGUS" array which comprises a set of the order of a thousand of telescopes of about 20 cm in diameter each arranged on a sphere of about 15 m in diameter. Despite the overall sizes of the artifact, the equivalent opening remains that of a single telescope, precisely equal to 20 cm in diameter.

This technical solution is particularly inefficient in volumetric terms, while maintaining a modest equivalent opening.

For openings of the order of a metre or more, on the other hand, Schmidt-type or "FlyEye" type telescopes are known. An example of "FlyEye" type telescopes is described in European patent EP 2901198 B1.

A further example of telescopes is described in the article by AARON M BROWN ET AL: "Panoramic SETI: overall mechanical system design", ARXIV.ORG, CORNELL UNIVERSITY LIBRARY, 201 OLIN LIBRARY CORNELL UNIVERSITY ITHACA, NY 14853, 24 Nov. 2021 (2021-11-24), XP091102807.

The Applicant has observed that the known optical solutions are extremely inefficient (in fact they require a collector area that is thousands or tens of thousands times that actually used simultaneously throughout the overall covered field of view) or in any case they require a continuous browsing of the sky with obvious and proportional limited time continuity of the search.

A further disadvantage is represented by the mass duplication of the telescopes required by such solutions to simultaneously cover the entire available celestial vault for a single position on Earth or equivalent situation.

SUMMARY OF THE INVENTION

Aim of the present invention to make available an optical system structurally and functionally designed to overcome at least one limit of the above-mentioned prior art.

This aim is achieved by an optical system made in accordance with the independent claim appended to the present description.

Further preferred features of the invention are defined in the dependent claims.

The meaning of certain terms and/or expressions used in this disclosure are set forth below.

The term "spherical" associated with an element, such as for example a body, a surface, or a cavity, means that said element is substantially shaped like a sphere.

The expression "solid spherical body" means a massive object, that is, without empty spaces, substantially shaped like a sphere.

The expression "light-transparent" associated with an element/substance/material means the ability of such element/substance/material not to significantly attenuate the light passing through it, i.e. it means that such element/substance/material is characterized by an attenuation length (distance through which light attenuation falls below the relative value of 1/e) of at least half a metre.

The expression "filler substance having a low refractive index" means a filler substance having a refractive index of less than 1.33.

The expression "filler substance having high transparency" means a filler substance characterized by an attenuation length (distance through which light attenuation falls below the relative value of 1/e) greater than 1 metre, preferably at least equal to 10 meters.

The expression "field lens" means a single lens or a lens system that acts as a substitute for it placed on a focal plane of the optical system.

The expression "outline" of a field lens means the edge of the field lens.

The expression "optical projection" means the image of a given object, e.g. a diaphragm, as seen by an observer located in a location other than that where the object is located.

The expression "light" means an electromagnetic radiation having a wavelength preferably comprised between 90 nm and 5000 nm, more preferably between 300 nm and 1000 nm.

In a first aspect thereof, the present invention is directed to an optical system.

The optical system comprises an optical device having a centre.

The optical device is a solid and light-transparent spherical body, or the optical device has a spherical shape and comprises a first spherical surface having as a centre the centre of the optical device, a plurality of two-by-two adjacent blocks covering the first spherical surface, and at least a filler substance contained in a spherical cavity delimited by the first spherical surface within the optical device.

The blocks are light-transparent lenses, preferably meniscus lenses.

The blocks define the outer surface of the optical device.

The filler substance is transparent to light.

The optical system further comprises a curved focal plane on which an image produced by the optical device is focused when it is illuminated.

The curved focal plane extends on a second spherical surface having as a centre the centre of the optical device and surrounding the optical device.

The optical system comprises a receiving device comprising a plurality of chambers arranged at the curved focal plane.

Each chamber comprises a field lens and a diaphragm.

The field lens is placed on the curved focal plane so that it has an optical axis passing through the centre of the optical device.

The diaphragm is placed downstream of the field lens with respect to the centre of the optical device and extends within a solid angle delimited by half lines having as their origin the centre of the optical device and passing through the outline of the field lens.

The diaphragm has the centre on the optical axis of the field lens so that optical projection of the diaphragm onto the optical device through the field lens defines a virtual diaphragm extending into the optical device and having as a centre the centre of the optical device.

These features advantageously allow to avoid placing a (physical) diaphragm inside the optical device, which would privilege one direction over the others.

In addition, the fact of placing the aforesaid plurality of chambers at the curved focal plane, on which an image produced by the optical device is focused when it is illuminated, allows the optical system according to the invention to be particularly advantageous in terms of the ratio between the amount of light it collects and the size of the optical system itself.

In particular, for the optical system according to the invention the ratio between the amount of light collected by the relative optical device and the size of the diameter thereof is particularly favourable.

De facto, the amount of light collected by the optical system according to the invention depends on the size of its optical device.

This makes it possible to obtain an optical system having a relatively large equivalent opening so as to be able to simultaneously collect light from the whole sky.

This result is not obtainable from the optical solutions described in the publications "Low-cost Access to the Deep, High-cadence Sky: the Argus Optical Array" and "Panoramic SETI: overall mechanical system design" mentioned above because in such solutions it is envisaged to mount telescopes with relatively limited fields of view on a spherical (or hemispherical) surface that acts exclusively as a mechanical support. Therefore, the amount of light collected by the optical solutions described in such publications does not depend in any way on the size of the relative sphere (or hemisphere), but depends solely on the opening of each individual telescope mounted on it, the size of the opening of such telescopes being more than ten times smaller than that of the relative sphere.

Preferably, the optical system is a telescope.

In at least one embodiment of the present solution, the optical device is a spherical symmetry monocentric device.

Preferably, the optical device has a diameter equal to or greater than 20 cm.

Preferably, the optical device has a diameter comprised between 20 cm and 2 meters. More preferably, the diameter of the optical device is 1 metre.

As indicated above, the optical device may correspond to a solid and light-transparent spherical body, preferably when its size is lower than one metre.

In this case, the aforesaid spherical body is preferably made of glass, more preferably optical glass.

Compared to a solid spherical body made of glass, even with low refractive index, such as for example quartz, the optical device comprising a spherical cavity filled with the filler substance can achieve one or more of the following advantages:

- a refractive index of the filler substance contained in the spherical cavity which is less than the refractive index of any glassy substance (e.g. quartz) that allows to have a longer focal ratio and thus to decrease the spherical aberration by which the image produced by the optical device is affected,
- the solid glass spherical body with thicknesses of the order of one metre may more easily exhibit an attenuation and/or inclusions greater than those of the filler substance,
- the melting and the machining of a solid glass spherical body of the order of one metre in diameter generally has a relatively high cost compared to the manufacture of blocks covering the first spherical surface, and
- glass with a density of about two and a half times that of a filler substance similar to water has a proportionally higher overall mass with obvious structural consequences on a support of the optical device and possibly also on the inner stresses of the glassy structure itself.

In at least one embodiment of the present solution, the diaphragm is arranged perpendicularly to the optical axis of the relative field lens.

Preferably, the diaphragm is made in the form of a disc perforated in the middle.

The diaphragms of the optical system define respective equivalent openings of the optical system.

In other words, each diaphragm allows to collect, downstream of the field lens with respect to the centre of the optical device, only the light that passes through the virtual diaphragm placed in the centre of the optical device, and characterizes a relative equivalent opening of the optical device with respect to the diameter of the latter.

Preferably, the equivalent opening has a circular shape with diameter at least equal to 60%, more preferably 80% or beyond, of the diameter of the optical device.

In at least one embodiment of the present solution, the optical device is made by tessellation of the first spherical surface, wherein the blocks cover the first spherical surface, without overlapping two by two.

In other words, the optical device comprises a spherical core containing a filler substance and a spherical crown surrounding the core and made by means of the above-described blocks.

In at least one embodiment of the present solution, the blocks have a first face and a second face opposite the first face, wherein the first faces of the blocks form an inner surface of the optical device while the second faces of the blocks form the outer surface of the optical device.

Substantially, the inner surface and the outer surface of the optical device have a single common centre of curvature.

Preferably, the blocks are made of glass, more preferably optical glass.

Preferably, the blocks have a refractive index greater than 1.4.

In at least one embodiment of the present solution, the blocks consist of sphere portions having a polygonal outline.

Preferably, the blocks have a pentagonal shape.

Alternatively, the blocks may be square or triangular.

Alternatively, the plurality of blocks corresponds to two spherical caps.

Preferably, the blocks have the same shape and sizes as each other.

Alternatively, the blocks may have different shapes and/or sizes from each other.

In at least one embodiment of the present solution, the outlines of the blocks are represented by the central projection of a dodecahedron.

In this case the blocks are made up of sphere portions having a pentagonal outline, all identical to each other in terms of size.

Therefore, in this circumstance the number of blocks is equal to twelve, but a different type of tessellation of the first spherical surface is not excluded from the present solution.

It should be noted that if the individual blocks are made by successive cutting of a block with circular outline, the case of the dodecahedron exposed above (that is, of twelve blocks with pentagonal shape) is the one that allows maximum efficiency between the (glassy) material used for the construction of the optical device and the final result.

In at least one embodiment of the present solution, tessellations with a number of blocks greater than twelve can be used, such as for example a tessellation consisting of 12 spherical blocks with a pentagonal outline and 20 spherical blocks with a hexagonal outline, for a total of 32 blocks.

In the case of large-sized spherical devices (for example larger than one metre in diameter), tessellations with a greater number of blocks are clearly favoured so that the individual blocks can have economically advantageous sizes and be easily manageable materially.

In at least one embodiment of the present solution, the outer surface of the optical device has a radius greater than or equal to 20 cm and/or less than or equal to 2 metres. Preferably, the outer surface of the optical device has a radius of 1 metre. This radius is referred to as the outer radius of the optical device.

The optical device therefore comprises an inner radius characterizing the spherical cavity, i.e. the first spherical surface, and an outer radius characterizing the outer surface of the optical device.

Preferably, the difference between the outer radius and the inner radius of the optical device is comprised between 2 cm and 10 cm.

In at least one embodiment of the present solution, this difference substantially coincides with the thickness of the blocks.

In particular, for optical devices with a relatively small diameter, i.e. less than 0.5 m, it is preferable to use blocks with a thickness of about 2 cm, whereas for optical devices with a relatively large diameter, i.e. greater than or equal to 1 metre, it is preferable to use blocks with a thickness of at least 5 cm.

In at least one embodiment of the present solution, the second spherical surface is sized so that it is extended at the focus position of the optical system.

The determination of the radius of the second spherical surface can therefore be based on the refractive index of the filler substance contained in the optical device.

Alternatively, the determination of the refractive index of the filler substance contained in the optical device may be based on the (predetermined) radius of the second surface so that the focus of the optical system is positioned on the second spherical surface.

Preferably, the filler substance has low refractive index and/or high transparency.

By way of example, the filler substance is preferably perfluorohexane (crude formula $C_6F_{14}$), also called FC-72, or it is preferably ethoxy-nonafluorobutane (crude formula $C_4F_9OC_2H_5$), also called NOVEC-7200.

The filler substance preferably completely fills the spherical cavity.

In at least one embodiment of the present solution, the filler substance is a fluid or aerogel.

In at least one embodiment of the present solution, the filler substance is a mixture of two or more fluids having respective refractive indices different from each other.

This feature is particularly useful in order to make the refractive index of the filler substance a free parameter if the choice of the position of the curved focal plane with respect to the centre of the optical device is constrained, for example for reasons of overall size of the optical system.

In at least one embodiment of the present solution, the chambers of the plurality of chambers are adjacent two by two. Preferably, the chambers are arranged so that the receiving device seamlessly occupies a portion of the second spherical surface.

Preferably, the receiving device (in particular the field lenses of the receiving device) is extended below a horizontal plane passing through the centre of the optical device.

In at least one embodiment of the present solution, the receiving device (in particular the field lenses of the receiving device) occupies the entire extension of a hemisphere of the second spherical surface.

This provision therefore makes it possible to obtain a simultaneous coverage of exactly half of the celestial sphere (or of equivalent field to be scanned).

In at least one embodiment of the present solution, the receiving device occupies a portion of the second spherical surface obtained by dividing the latter by two secant planes containing the centre of the optical device.

Preferably, the two secant planes form an inner angle greater than, or equal to, 120°, and in any case less than 180°.

This configuration is particularly useful for establishing privileged directions in which the incident light beam of the optical device is unvignetted, despite it comes from the horizon.

By way of example, a solution that may be preferable for applications that provide for the observation of objects located outside the Earth's atmosphere (such as for example for observations of the astronomical type or of artificial objects in orbit around the Earth) consists in limiting the observation only for objects above a certain minimum elevation from the horizon, allowing however this field to be collected through unvignetted beams and therefore with maximum efficiency, favouring lines of sight with a shorter length within the Earth's atmosphere.

For example, observing only objects with an equivalent air mass equal to 2 (that is, whose optical path covers a length in the atmosphere at the most double that of those coming from the zenith or from the local vertical), a maximum height of 30 degrees is placed on the horizon, hence a total collected field of view of about ten thousand square degrees.

In at least one embodiment of the present solution, the optical system comprises a frame provided with a plurality of two-by-two adjacent openings delimiting respective seats adapted to accommodate respective blocks of the optical device.

In this circumstance, the (small) amount of light intercepted by the frame must be removed from the light collected with the equivalent diameter of the opening of the optical system according to the invention.

The blocks are therefore held in place by means of the frame, wherein the individual blocks are preferably mounted so as to cover, together with extended frame portions between the blocks, completely the first spherical surface and allow undisturbed transit of light, except for darkenings due to the frame.

It should furthermore be noted that the use of identical blocks allows a tessellation with high density, that is with minimal interruption of the light due to the frame, using the so-called platonic solids.

Preferably, the frame is made of metal or composite material and in any case suitable for retaining the blocks in their respective seats.

Preferably, the openings of the frame and the blocks have the same shape.

Preferably, the frame is in the form of a polyhedron (in particular a regular polyhedron).

Preferably, the frame forms the edges of the polyhedron.

Preferably, the openings of the frame are polygonal in shape. Specifically, the openings of the frame can correspond to the faces of the polyhedron.

Alternatively, the openings of the frame may be circular in shape, inscribed in respective faces of the polyhedron.

Preferably, each opening of the frame is defined by an edge of the frame provided with a groove shaped to accommodate a peripheral portion of a block.

Preferably, the optical system comprises a gasket, in particular an O-ring gasket, for each seat of the frame, the gasket being arranged between a block and the frame.

Specifically, the gasket is extended in the groove that accommodates the peripheral portion of a block, is leaned against an outer portion of the edge of the frame and against the block itself.

In addition, the optical system may comprise an elastic pre-loader for each seat of the frame, arranged in the groove of the edge of the frame opposite the gasket. The elastic pre-loader lies on an inner portion of the edge of the frame and on the block, exerting a pressure on the latter that prevents the leakage of the filler substance contained in the spherical cavity through the gasket.

It should be noted that after filling the spherical cavity with the filler substance, having a certain density, the blocks are subjected to a hydraulic pressure force, with a linear vertical trend as a function of the equivalent column level of filler substance.

In at least one embodiment of the present solution, the optical system comprises thermal compensators having a thermal expansion coefficient greater than that of the material constituting the blocks, the thermal compensators being arranged in the seats between the blocks and the frame.

Preferably, the thermal compensators are made of DELRIN or TEFLON.

This provision is particularly useful for compensating for variations in relative sizes between the frame and the blocks, if the frame and the blocks have a different thermal expansion coefficient from one another.

In at least one embodiment of the present solution, the optical system comprises one or more arms extending from the frame up to a base so as to keep the frame and the optical device spaced apart from the receiving device.

In at least one embodiment of the present solution, at least one of the aforesaid chambers, preferably each chamber, further comprises a correction optical unit arranged downstream of the diaphragm with respect to the centre of the optical device.

The optical correction unit is arranged to correct the spherical aberrations present in the image projected on the field lens of the relative camera.

Specifically, the image projected on the field lens corresponds to that part of the image produced by the optical device, when it is illuminated, which affects the field lens.

Preferably, the correction optical unit has the same optical axis as the relative field lens.

Preferably, the field lens, the diaphragm and the correction optical unit belonging to the same chamber are aligned on the optical axis of the field lens.

Preferably, the correction optical unit is arranged to also correct the chromatic aberrations present in the image projected on the field lens of the relative camera.

In at least one embodiment of the present solution, the correction optical unit comprises appropriately shaped aspherical surfaces for the correction of the aforesaid aberrations.

In at least one embodiment of the present solution, the correction optical unit is arranged to straighten the curvature of the curved focal plane.

Preferably, the correction optical unit comprises a flattening lens shaped to straighten the curvature of the curved focal plane.

In at least one embodiment of the present solution, at least one of the chambers, preferably each chamber, further comprises an optical detector arranged downstream of the correction optical unit with respect to the centre of the optical device.

In particular, the optical detector is adapted to convert the image projected on the field lens into an electrical signal that is readable through a specific electronic data reception and collection system.

Specifically, the plurality of optical detectors allow to convert the set of images of portions of the sky into an electrical signal that is readable through a specific electronic data reception and collection system.

Preferably, the field lens, the diaphragm, the correction optical unit and the optical detector belonging to the same chamber are aligned on the optical axis of the field lens.

Preferably, the optical detector is a CCD or CMOS detector.

Preferably, the correction optical unit is arranged to straighten the curvature of the curved focal plane so that the light entering the relative chamber through the field lens illuminates the optical detector with an optical quality of the order of the arcsecond.

In at least one embodiment of the present solution, the correction optical unit thus compensates for the spherical and, preferably, chromatic aberrations introduced on the curved focal plane, i.e. on the surface of the field lenses.

In at least one embodiment of the present solution, the width of the field of view of the optical detector is greater than the nominal field of view covered by the relative field lens.

This feature advantageously allows not to lose any luminous flux, except for those due to the possible not perfect coincidence between the edges of adjacent field lenses.

In fact, the possible spherical aberration introduced by the optical device causes a scattering of the light coming from points that are close to the edge of the nominal field of view covered by the field lens.

The field of view of the optical detectors is thus oversized, for example by twice the magnitude of the scattering due to the spherical aberration (one per side of the field of view) so that the light coming from sources that are located near the edge of the nominal field of view covered by the field lens is split between adjacent chambers.

Thanks to this approach there are no blind spots, even in the presence of an ineffective edge between the field lenses.

In at least one embodiment of the present solution, the optical system comprises a support on which the chambers are mounted.

Preferably, the support is rotatable about a rotation axis parallel to the Earth rotation axis.

This provision is particularly useful for astronomical applications of the optical system according to the present solution.

In at least one embodiment of the present solution, the optical system comprises a drive operatively connected to the support of the chambers.

The drive may be an electric drive.

The drive is arranged to repeat to cyclically repeat the following steps:

- rotating the support about the rotation axis synchronously with the Earth movement and for a predetermined angle so as to move the support from a rest position to an end position, and, subsequently,
- rotating the support about the rotation axis so as to move the support from the end position to the rest position.

Preferably, the drive is arranged so that the movement of the support about its rotation axis from the end position to the rest position is faster than that of the support when it rotates synchronously with the Earth movement.

In this way it is possible to compensate for the apparent rotation of the sky for successive poses efficiently, with no need to create a greater number of chambers than those actually used.

In particular, the drive may comprise at least one electric motor, at least one control unit operatively connected to the at least one electric motor for driving the latter and at least one motion transmission system operatively connected to the at least one electric motor and to the support for rotating it on the basis of at least one signal generated by the control unit.

These characteristics are particularly useful for compensating for the apparent displacement of the celestial vault.

Figure 2:
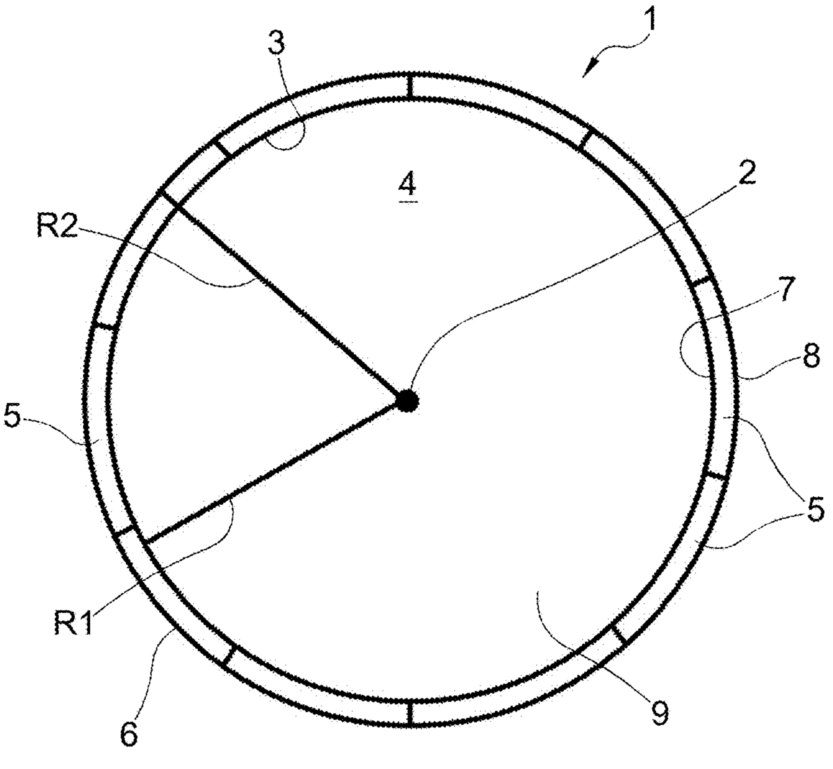
Figure 8:
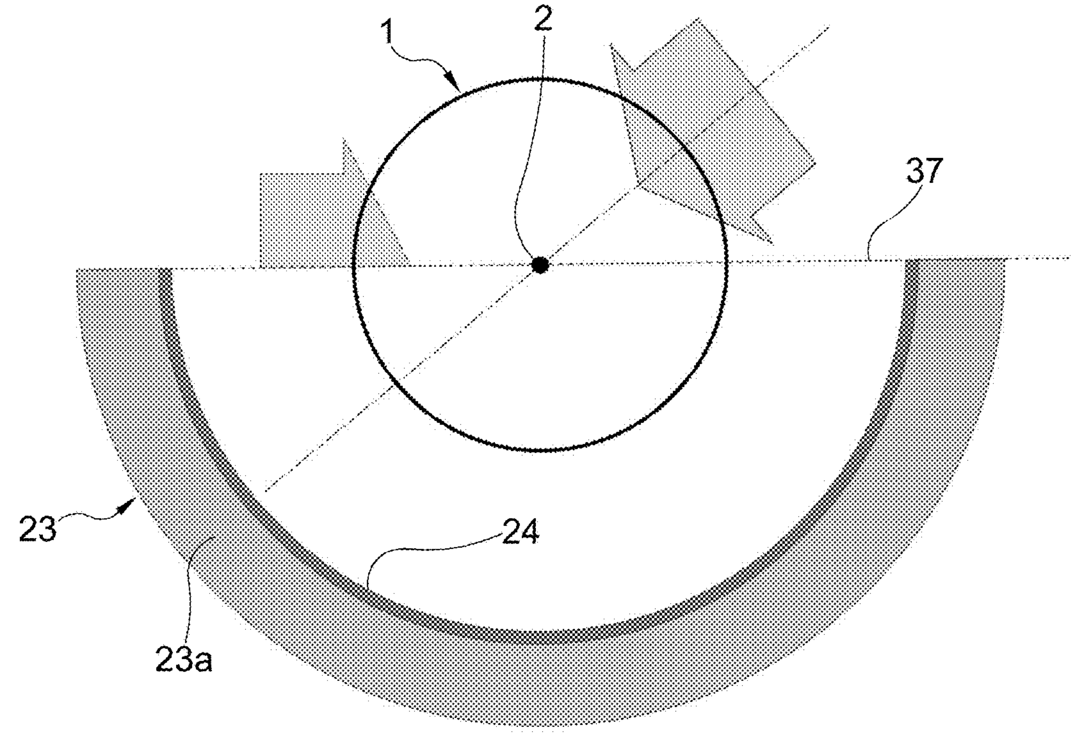
Figure 9:
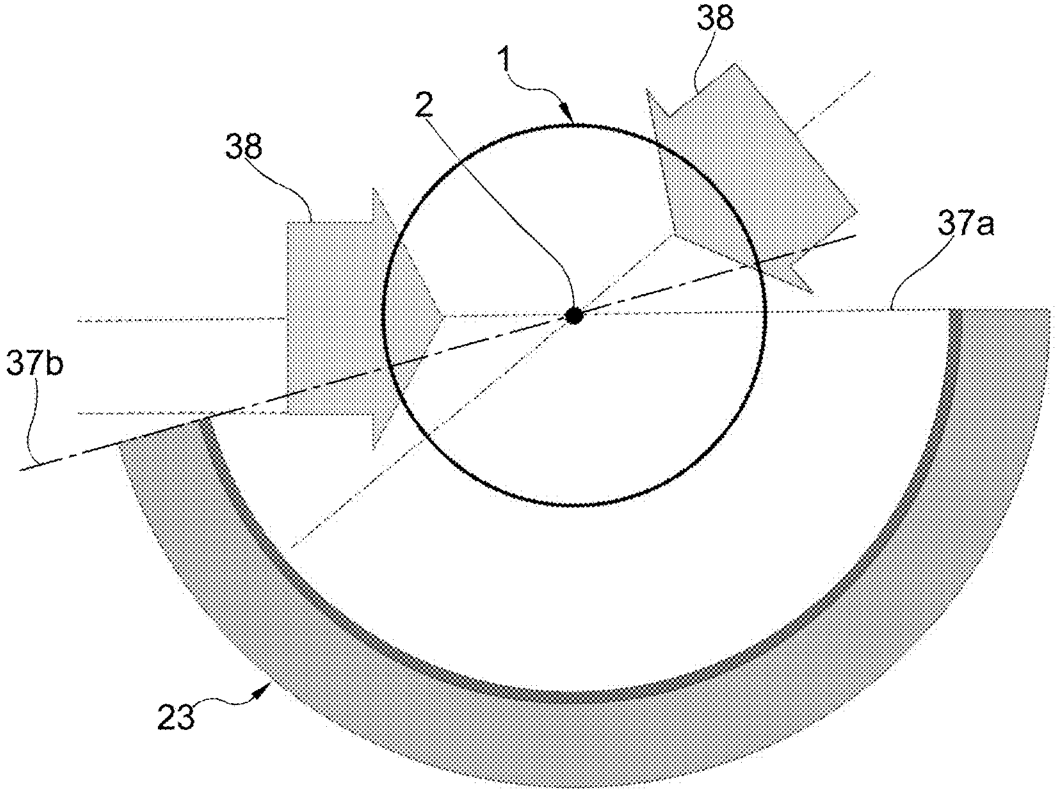
Figure 10:
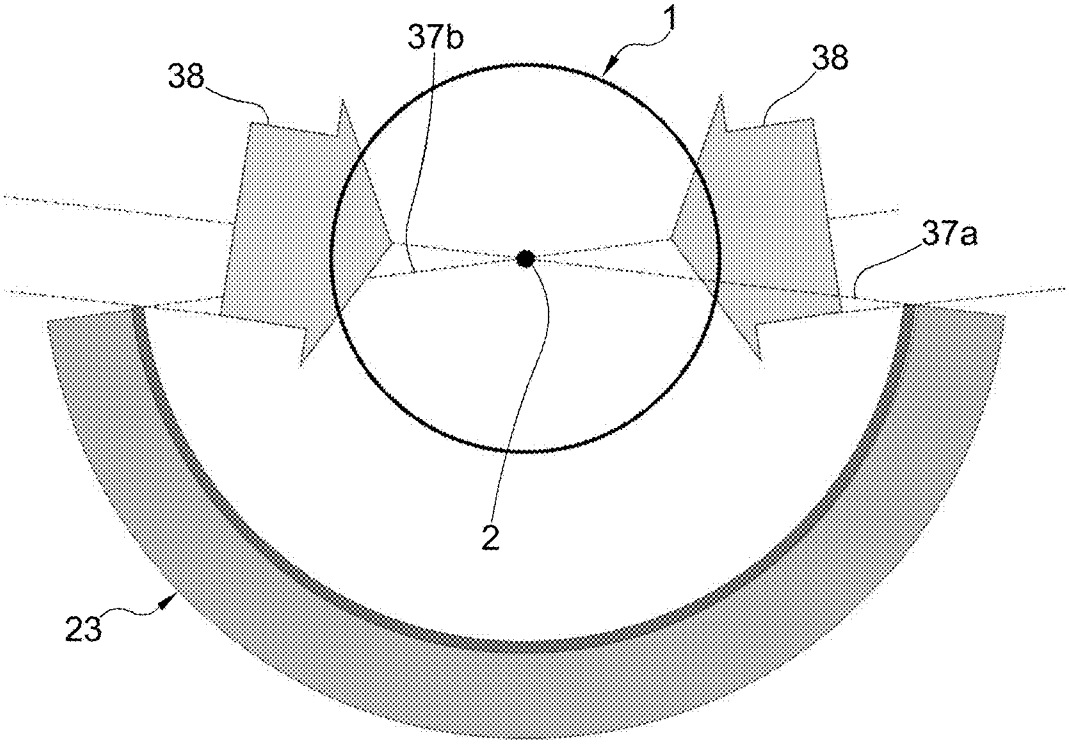
Figure 11:
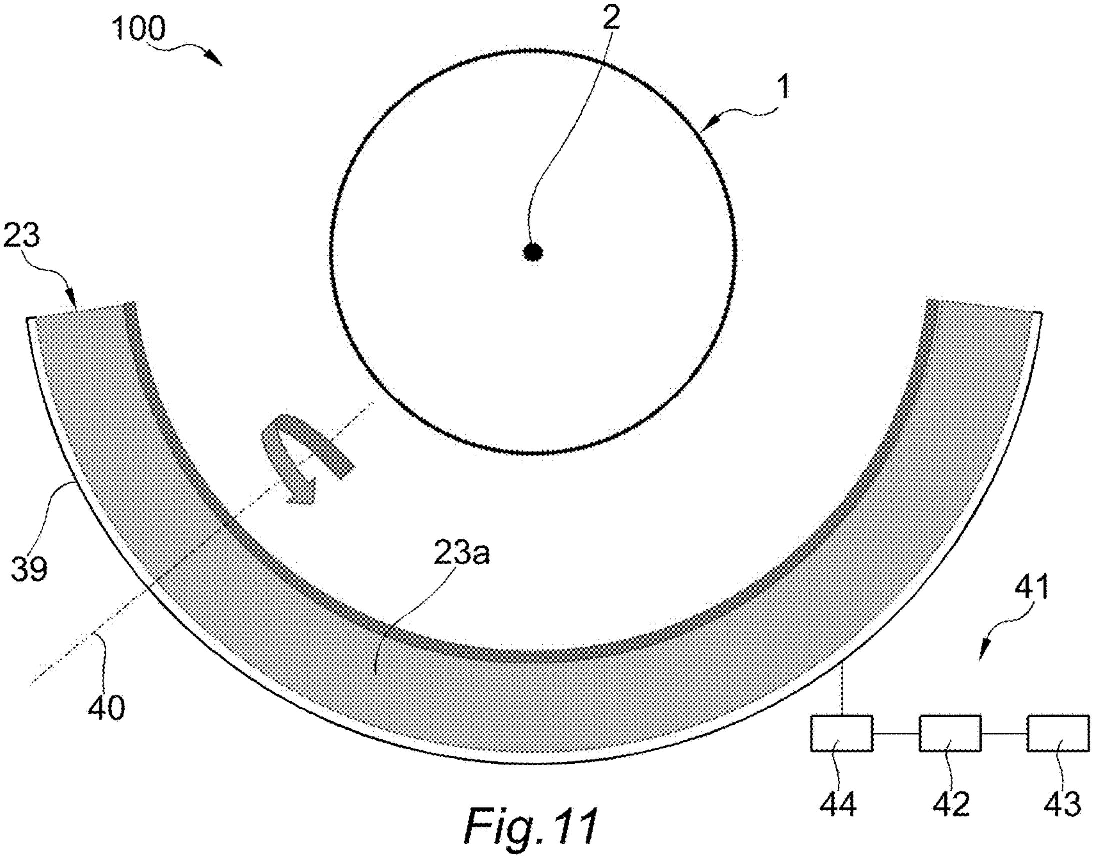

The characteristics and advantages of the present solution will best result from the detailed description of preferred embodiments thereof, illustrated by way of non-limiting example with reference to the accompanying drawings, in which:

FIG. 1 is a schematic perspective view of an optical system in accordance with an embodiment of the present solution, FIG. 2 is a schematic sectional representation of an optical device in accordance with an embodiment of the present solution, FIG. 3A is a schematic perspective view of an optical device in accordance with an embodiment of the present solution, FIG. 3B is a schematic sectional view of a block and of a frame portion in accordance with an embodiment of the present solution, FIGS. 4-6 are partial schematic representations of an optical system in accordance with respective embodiments of the present solution, FIG. 7 shows a correct superposition of the fields of view for each chamber provided with a correction optical unit in accordance with an embodiment of the present solution, FIGS. 8-10 are schematic representations of an optical system with a receiving device according to different configurations in accordance with respective embodiments of the present solution, FIG. 11 is a schematic representation of an optical system having a support for chambers rotatable about a rotation axis parallel to the Earth rotation axis in accordance with an embodiment of the present solution.

With reference to the enclosed figures, an optical system made in accordance with the present invention is indicated overall with 100.

With particular reference to FIGS. 1 and 2, the device 100 comprises an optical device 1 having a spherical shape and a centre 2.

The optical device 1 has a first spherical surface 3 having as a centre the centre 2 of the optical device 1, the first spherical surface 3 delimiting a spherical cavity 4 within the optical device 1.

A plurality of two-by-two adjacent blocks 5 cover the first spherical surface 3, the blocks being lenses made of optical glass, transparent to light and defining the outer (spherical) surface 6 of the optical device 1.

In detail, the blocks 5 have a first face 7 and a second face 8 opposite to the first face 7, where the first faces 7 form an inner surface of the optical device 1, i.e. the first spherical surface 3, while the second faces 8 form the aforesaid outer surface 6.

In a preferred embodiment of the invention, the first spherical surface 3 and the outer surface 6 are concentric and have radius R1 equal to 0.95 m and, respectively, radius R2 equal to 1 m.

With particular reference to FIG. 3A, the blocks 5 consist of sphere portions having a polygonal, specifically pentagonal, outline.

The optical system 100 comprises at least filler substance 9 having low refractive index and high transparency, the filler substance 9 being contained in the spherical cavity 4.

Preferably, the filler substance 9 is a fluid, which may correspond to a mixture of two or more fluids having respective refractive indices different from each other.

In a preferred embodiment of the invention, the filler substance 9 is a fluid having refractive index equal to 1.25 and transparency equal to 0.3 $m^{-1}$.

The optical system 100 comprises a frame 10 provided with a plurality of two-by-two adjacent openings 11 delimiting respective seats 12 adapted to accommodate respective blocks 5.

Preferably, the frame 10 is made of metallic material.

In a preferred embodiment of the invention, the frame 10 forms a regular dodecahedron whose faces correspond to respective pentagonal openings 11.

With particular reference to FIG. 3B, each opening 11 of the frame 10 is defined by an edge 13 of the frame 10 provided with a groove 14 shaped to accommodate a peripheral portion 15 of a block 5.

The optical system 100 further comprises a gasket 16 (O-ring) for each seat 12 of the frame 10.

The gasket 16 is arranged between a block 5 and the frame 10, extending in the groove 14 that accommodates the peripheral portion 15 of a block 5 and is leaned against an outer portion 17 of the edge 13 of the frame 10 and against the block 5 itself.

In addition, the optical system 100 comprises an elastic pre-loader 18 for each seat of the frame 10, arranged in the groove 14 on the opposite side to the gasket 16. The elastic pre-loader 18 lies on an inner portion 19 of the edge 13 of the frame 10 and on the block 5, exerting a pressure on the latter that prevents the leakage of the filler substance 9 contained in the spherical cavity 4.

In addition, the optical system 100 comprises thermal compensators 20 (made of DELRIN or TEFLON) having a thermal expansion coefficient greater than that of the material constituting the blocks 5, the thermal compensators being arranged in the seats 12 between the blocks 5 and the frame 10.

With particular reference to FIG. 4, the optical system 100 comprises a curved focal plane 21 on which an image produced by the optical device 1 is focused when it is illuminated. The curved focal plane 21 extends on a second spherical surface 22 having as a centre the centre 2 of the optical device 1 and surrounding said optical device 1.

With particular reference to FIGS. 1-4, the optical system 100 comprises a receiving device 23 comprising a plurality of chambers 23*a* arranged at the curved focal plane 21.

In detail, the chambers 23*a* are adjacent two by two so that the receiving device 23 seamlessly covers a portion of the second spherical surface 22.

In a preferred embodiment of the invention, the optical system 100 comprises one or more arms 10*a* extending from the frame 10 as far as a base 10*b* that keep the frame 10 and the optical device 1 spaced apart from the receiving device 23.

Each chamber 23*a* comprises a field lens 24, placed on the curved focal plane 21 so that it has an optical axis 25 passing through the centre 2 of the optical device 1, and a diaphragm 26 arranged downstream of the field lens 24 with respect to the centre 2 of the optical device 100.

The diaphragm 26 extends within a solid angle 27 delimited by half lines 28 having as their origin the centre 2 of the optical device 1 and passing through the outline 29 of the field lens 24.

The diaphragm 26 has a centre on the optical axis 25 of the relative field lens 24 so that the optical projection of the diaphragm 26 on the optical device 1 through the field lens 24 defines a virtual diaphragm 30 extending in the optical device 1 and having as its centre the centre 2 of the optical device 1.

It should be noted that the diaphragm 26 of each chamber 23*a* is arranged perpendicularly to the optical axis 25 of the relative field lens 24 thereby defining a corresponding equivalent opening of the optical system 100.

With particular reference to FIG. 5, each chamber 23*a* further comprises a correction optical unit 31 arranged downstream of the diaphragm 26 with respect to the centre 2 of the optical device 1 and having an optical axis coinciding with that of the relative field lens 24.

The optical correction unit 31 is arranged to correct both the spherical and chromatic aberrations present in the image projected onto the field lens 24 of the relative chamber 23*a*.

In a preferred embodiment of the invention, the correction optical unit 31 comprises appropriately shaped aspherical surfaces 32 for the correction of the aforesaid aberrations.

The optical correction unit 31 is also arranged to straighten the curvature of the curved focal plane 21.

In a preferred embodiment of the invention, the correction optical unit 31 comprises a flattening lens 33 shaped to straighten the curvature of the curved focal plane 21.

Each chamber 23*a* of the optical system 100 further comprises an optical detector 34 (CMOS) arranged downstream of the correction optical unit 31 with respect to the centre 2 of the optical device 1.

In detail, the field lens 24, the diaphragm 26, the correction optical unit 31 and the optical detector 34 belonging to the same chamber 23*a* are aligned on the optical axis 25 of the field lens 24.

Preferably, the correction optical unit 31 is arranged to straighten the curvature of the curved focal plane 21 so that the light entering the chamber 23*a* through the field lens 24 illuminates the optical detector 34 with an optical quality of the order of the arcsecond.

With particular reference to FIGS. 6 and 7, the width of the field of view 35 of the optical detector 34 is greater than the nominal field of view 36 covered by the relative field lens 24.

The field of view 35 of the optical detectors 34 are thus oversized by the size of the light scattering due to the spherical aberration introduced by the optical device.

FIG. 8 shows, in a schematic way, a possible configuration of the receiving device 23.

In particular, FIG. 8 is a schematization of the optical system 100 of FIG. 1, wherein the receiving device 23 occupies the entire extension of a hemisphere 22*a* of the second spherical surface 22, the receiving device 23 being extended below a horizontal plane 37 passing through the centre 2 of the optical device 1.

In this case, the optical system 100 allows to cover half of the celestial sphere by accepting a vignetting for light sources at the edge of the field of view covered by the plurality of chambers 23*a*.

FIGS. 9 and 10 show different configurations of the receiving device 23, wherein the receiving device 23 occupies a portion of the second spherical surface 22 obtained by dividing the latter by two secant planes 37*a*, 37*b* containing the centre 2 of the optical device 1.

The secant planes 37*a*, 37*b* of FIG. 9 correspond one to a horizontal plane and the other to an inclined plane forming with the horizontal plane an angle equal to 150°.

The secant planes 37*a*, 37*b* of FIG. 10 correspond to incident planes in a horizontal plane and form an inner angle equal to 150°.

The configurations of the receiving device 23 shown in FIGS. 9 and 10 also allow to establish privileged directions of light beams 38 incident on the optical device 1 which are not subject to the vignetting phenomenon.

With particular reference to FIG. 11, the optical system 100 comprises a support 39 on which the chambers 23*a* are mounted, the support 39 being rotatable about a rotation axis 40 parallel to the Earth rotation axis.

In a preferred embodiment of the invention, the optical system 100 further comprises an electrical drive 41 operatively connected to the support 39 of the chambers 23*a* and arranged to cyclically repeat the following steps:

rotating the support 39 about the rotation axis 40 synchronously with the Earth movement and for a predetermined angle so as to move the support 39 from a rest position to an end position, and, subsequently, rotating the support 39 about the rotation axis 40 so as to move the support 39 from the end position to the rest position, with a higher rotation speed than the previous step.

In detail, the electric drive 41 comprises an electric motor 42, a control unit 43 operatively connected to the electric motor 43 for driving the latter and a motion transmission system 44 operatively connected to the electric motor 43 and to the support 39 for rotating the latter on the basis of at least one signal 45 generated by the control unit 43.

The invention claimed is:

1. An optical system comprising:

an optical device having a center, wherein said optical device is a solid and light-transparent spherical body or wherein said optical device has a spherical shape and comprises:

a first spherical surface having as a center the center of said optical device, wherein said first spherical surface delimits a spherical cavity within said optical device, a plurality of two-by-two adjacent blocks covering said first spherical surface, wherein said blocks are light-transparent lenses and define the outer surface of said optical device, at least a light-transparent filler substance, said filler substance being contained in said spherical cavity, a curved focal plane on which an image produced by said optical device is focused when the optical device is illuminated, said curved focal plane being extended on a second spherical surface having as a center the center of said optical device and surrounding said optical device, a receiving device comprising a plurality of chambers arranged at said curved focal plane, wherein each chamber comprises:

a field lens placed on said curved focal plane so that it has an optical axis passing through the center of said optical device, and a diaphragm placed downstream of said field lens with respect to the center of said optical device and extending within a solid angle delimited by half lines having as their origin the center of said optical device and passing through the outline of said field lens, wherein said diaphragm has the center on said optical axis of said field lens, so that the optical projection of said diaphragm onto said optical device through said field lens defines a virtual diaphragm extending into said optical device and having as its center the center of said optical device.

2. The optical system according to claim 1, wherein said filler substance has at least one of: a low refractive index or high transparency.

3. The optical system according to claim 1, wherein said filler substance is a fluid or aerogel, wherein said fluid is a mixture of two or more fluids having respective refractive indices different from each other.

4. The optical system according to claim 1 further comprising a frame provided with a plurality of two-by-two adjacent openings delimiting respective seats adapted to accommodate respective blocks of said optical device.

5. The optical system according to claim 4, comprising thermal compensators having a thermal expansion coefficient greater than that of the material constituting said blocks, said thermal compensators being arranged in said seats between said blocks and said frame.

6. The optical system according to claim 1, wherein the blocks are comprised of sphere portions having polygonal outlines.

7. The optical system according to claim 1, wherein at least one of said chambers further comprises a correction optical unit arranged downstream of said diaphragm with respect to the center of said optical device, said correction optical unit being arranged to correct spherical aberrations present in the image projected onto said field lens of the relative chamber.

8. The optical system according to claim 7, wherein for at least one of said chambers, the relative field lens and the relative diaphragm and correction optical unit are aligned on the optical axis of said field lens.

9. The optical system according to claim 7, wherein at least one of said chambers further comprises an optical detector arranged downstream of said correction optical unit with respect to the center of said optical device.

10. The optical system according to claim 9, wherein for at least one of said chambers, the relative field lens and the relative diaphragm, correction optical unit and optical detector are aligned on the optical axis of said field lens.

11. The optical system according to claim 9, wherein said correction optical unit is arranged to straighten the curvature of said curved focal plane so that the light entering the relative chamber through said field lens illuminates said optical detector with an optical quality of the order of the arcsecond.

12. The optical system according to claim 9, wherein the width of the field of view of said optical detector is greater than the nominal field of view covered by the relative field lens.

13. The optical system according to claim 1 further comprising a support on which said chambers are mounted, said support being rotatable about a rotation axis parallel to the Earth's rotation axis.

14. The optical system according to claim 13, comprising a drive operatively connected to said support, said drive being arranged to cyclically repeat the following steps:

rotating said support about said rotation axis synchronously with the Earth's movement and for a predetermined angle so as to move said support from a rest position to an end position, and, subsequently, rotating said support about said rotation axis so as to move said support from said end position to said rest position.

15. The optical system according to claim 14, wherein said drive is arranged so that the movement of the support about its rotation axis from the end position to the rest position is faster than that of the support when the support rotates synchronously with the Earth movement.

* * * * *